US012122293B2

United States Patent
Kim et al.

(10) Patent No.: US 12,122,293 B2
(45) Date of Patent: Oct. 22, 2024

(54) SOUND GENERATION APPARATUS OF ELECTRIFICATION VEHICLE AND METHOD THEREOF

(71) Applicants: Hyundai Motor Company, Seoul (KR); Kia Corporation, Seoul (KR)

(72) Inventors: Ki Chang Kim, Gyeonggi-do (KR); Tae Kun Yun, Gyeonggi-do (KR); Dong Chul Park, Gyeonggi-do (KR); Eun Soo Jo, Gyeonggi-do (KR); Jin Sung Lee, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 120 days.

(21) Appl. No.: 17/852,562

(22) Filed: Jun. 29, 2022

(65) Prior Publication Data
US 2023/0146799 A1    May 11, 2023

(30) Foreign Application Priority Data

Nov. 11, 2021  (KR) .......................... 10-2021-0155070

(51) Int. Cl.
*B60Q 5/00* (2006.01)
*G10K 15/02* (2006.01)
*G10K 15/04* (2006.01)

(52) U.S. Cl.
CPC ............. *B60Q 5/008* (2013.01); *G10K 15/02* (2013.01); *G10K 15/04* (2013.01); *B60Y 2306/11* (2013.01)

(58) Field of Classification Search
CPC ........ B60Q 5/008; G10K 15/02; G10K 15/04; B60Y 2306/11

USPC ...................................................... 340/425.5
See application file for complete search history.

(56) References Cited

U.S. PATENT DOCUMENTS

| | | | | |
|---|---|---|---|---|
| 2007/0269054 | A1* | 11/2007 | Takagi | A63F 13/57 381/71.4 |
| 2009/0277707 | A1* | 11/2009 | Ballard | F04D 25/06 340/384.3 |
| 2010/0166210 | A1* | 7/2010 | Isozaki | B60L 3/00 381/86 |
| 2010/0246843 | A1* | 9/2010 | Palmestal | G10K 15/02 381/61 |

(Continued)

FOREIGN PATENT DOCUMENTS

| KR | 101744716 B1 | 6/2017 |
|---|---|---|
| KR | 101856935 B1 | 5/2018 |

(Continued)

OTHER PUBLICATIONS

Jongil Park et al. "A development of the Emotional Engine Performance for Luxury and High-Performance Vehicle", 2018 KSAE; pp. 78-83.

*Primary Examiner* — Zhen Y Wu
(74) *Attorney, Agent, or Firm* — Fox Rothschild LLP

(57) ABSTRACT

A sound generation apparatus for an electrification vehicle and a method of use thereof are provided. In example embodiments, the sound generation apparatus receives driving information, determines a driving situation based on the driving information, designs an acceleration sound when the driving situation is determined as an acceleration situation, or designs a cornering sound when the driving situation is determined as a cornering situation, and plays and outputs the acceleration sound or the cornering sound.

18 Claims, 12 Drawing Sheets

(56) References Cited

U.S. PATENT DOCUMENTS

| | | | | |
|---|---|---|---|---|
| 2011/0044470 A1* | 2/2011 | Ogata | ...................... | B60R 21/34 |
| | | | | 381/86 |
| 2011/0093149 A1* | 4/2011 | Tanaka | .............. | B60W 50/0098 |
| | | | | 903/902 |
| 2011/0241868 A1* | 10/2011 | Iwamoto | ................ | B60Q 5/008 |
| | | | | 340/463 |
| 2013/0038435 A1* | 2/2013 | Muroya | ................ | G10K 15/02 |
| | | | | 340/425.5 |
| 2014/0266658 A1* | 9/2014 | Feldman | ................ | B60Q 5/005 |
| | | | | 340/438 |
| 2018/0043826 A1* | 2/2018 | Every | ....................... | B60C 9/00 |
| 2018/0366103 A1* | 12/2018 | Niibe | ...................... | B60R 11/02 |
| 2019/0311705 A1* | 10/2019 | Trumpy | ................ | G10K 15/02 |
| 2019/0392811 A1* | 12/2019 | Lee | .......................... | H04R 3/00 |
| 2020/0184946 A1* | 6/2020 | Jung | ..................... | B60Q 5/008 |
| 2022/0051653 A1* | 2/2022 | Frank | .................... | H04R 1/028 |
| 2022/0223138 A1* | 7/2022 | Akahori | ................ | G10K 15/02 |

FOREIGN PATENT DOCUMENTS

| KR | 20180045672 A | 5/2018 |
|---|---|---|
| KR | 102006851 B1 | 8/2019 |
| KR | 102131390 B1 | 7/2020 |

\* cited by examiner

| CAN 1 (%) | Gain(dB) |
|---|---|
| 0 | -2.0000 |
| 10 | -1.6000 |
| 20 | -0.8000 |
| 30 | 0.0000 |
| 40 | 1.0000 |
| 50 | 3.0000 |
| 60 | 6.0000 |
| 70 | 7.0000 |
| 80 | 8.0000 |
| 90 | 8.0000 |
| 100 | 8.0000 |

Fig.3

SOUND GENERATION APPARATUS OF ELECTRIFICATION VEHICLE AND METHOD THEREOF

CROSS-REFERENCE TO RELATED APPLICATION

This application claims, under 35 U.S.C. § 119(a), the benefit of Korean Patent Application No. 10-2021-0155070, filed on Nov. 11, 2021, the entire contents of which are incorporated herein by reference.

BACKGROUND

(a) Field

The present disclosure relates to a sound generation apparatus of an electrification vehicle and a method thereof.

(b) Description of Related Art

Because an electrification vehicle (e.g., an electric vehicle, a hydrogen electric vehicle, or the like) drives using its electric motor, there is no engine sound in the electrification vehicle. Therefore, it is difficult for a pedestrian to recognize an approaching vehicle. To address this issue, a virtual engine sound system (VESS) or an acoustic vehicle alerting system (AVAS) which generates a virtual engine sound and allows a pedestrian to recognize the virtual engine sound has been developed and has been compulsorily installed in some electrification vehicles.

The VESS or the AVAS implements an engine sound using an electronic sound generator (ESG). The ESG is mounted on a cowl top panel of the vehicle to generate an additional sound (or a structure vibration sound) using body vibration when the engine sound is generated. However, as noise occurs in a weld part of a body cowl bracket loaded with the ESG and a cowl top cover, quality costs for structural reinforcement and vibration insulation are excessive.

Accordingly, there is a need in the industry for a method of generating sound in an electrification vehicle which is an alternative to currently used systems.

SUMMARY

An exemplary embodiment of the present disclosure provides a sound generation apparatus of an electrification vehicle for designing an acceleration sound or a cornering sound based on driving information, such as, for example, a driving tendency and/or a driving environment.

According to an aspect of the present disclosure, a method of generating sound in an electrification vehicle may include receiving, by a processing device, driving information, determining, by the processing device, a driving situation based on the driving information, designing, by the processing device, an acceleration sound when the driving situation is determined as an acceleration situation, designing, by the processing device, a cornering sound when the driving situation is determined to be a cornering situation, and playing and outputting, by the processing device, the acceleration sound or the cornering sound.

The receiving of the driving information may include receiving, by the processing device, at least one of motor revolutions per minute (RPM), a motor torque, a vehicle speed, or an accelerator pedal opening amount from a detection device.

The receiving of the driving information may include receiving, by the processing device, at least one of a driver steering angle or a tire steering angle from a detection device.

The receiving of the driving information may include receiving, by the processing device, a controller area network (CAN) message through CAN communication and determining, by the processing device, a driving tendency and a road environment based on data included in the CAN message using a CAN algorithm.

The designing of the acceleration sound may include generating, by the processing device, a post-combustion signal based on the driving information, converting, by the processing device, the generated post-combustion signal into the acceleration sound, and tuning, by the processing device, sound quality of the converted acceleration sound.

The converting of the acceleration sound may include adjusting, by the processing device, sound pressure of the acceleration sound depending on a magnitude of the post-combustion signal and adjusting, by the processing device, the acceleration sound to be played at a time when the post-combustion signal is generated.

The designing of the cornering sound may include calculating, by the processing device, a cornering force based on the driving information, generating, by the processing device, the cornering sound based on the calculated cornering force, and adjusting, by the processing device, a tone and volume of the generated cornering sound.

The calculating of the cornering force may include analyzing, by the processing device, at least one of a longitudinal force, a lateral force, a tire slip ratio, or a tire slip angle based on the driving information to calculate the cornering force.

The playing and outputting of the acceleration sound or the cornering sound may include outputting, by the processing device, the played sound to the outside of the electrification vehicle through an external speaker.

The external speaker may be installed on the rear of an exhaust manifold.

According to another aspect of the present disclosure, a sound generation apparatus of an electrification vehicle may include a detection device that detects driving information and a processing device connected with the detection device. The processing device may determine a driving situation based on the driving information, may design an acceleration sound, when the driving situation is determined as an acceleration situation, may design a cornering sound, when the driving situation is determined as a cornering situation, and may play and output the acceleration sound or the cornering sound.

The driving information may comprise at least one of motor RPM, a motor torque, a vehicle speed, or an accelerator pedal opening amount.

The driving information may comprise at least one of a driver steering angle or a tire steering angle from the detection device.

The processing device may be configured to receive a CAN message through CAN communication and may be configured to determine a driving tendency and a road environment based on data included in the CAN message using a CAN algorithm.

The processing device may be configured to generate a post-combustion signal based on the driving information, may convert the generated post-combustion signal into the acceleration sound, and may tune sound quality of the converted acceleration sound.

The processing device may be configured to adjust sound pressure of the acceleration sound depending on a magnitude of the post-combustion signal and may adjust the acceleration sound to be played at a time when the post-combustion signal is generated.

The processing device may be configured to calculate a cornering force based on the driving information, may generate the cornering sound based on the calculated cornering force, and may adjust a tone and volume of the generated cornering sound.

The processing device may be configured to analyze at least one of a longitudinal force, a lateral force, a tire slip ratio, or a tire slip angle based on the driving information to calculate the cornering force.

The processing device may be configured to output the played acceleration sound or cornering sound to the outside of the electrification vehicle through an external speaker.

The external speaker may be disposed on the rear of an exhaust manifold.

BRIEF DESCRIPTION OF THE DRAWINGS

The above and other objects, features and advantages of the present disclosure will be more apparent from the following detailed description taken in conjunction with the accompanying drawings.

FIG. 3 is a drawing illustrating again table for a CAN signal according to example embodiments of the present disclosure.

DETAILED DESCRIPTION

Figure 1:
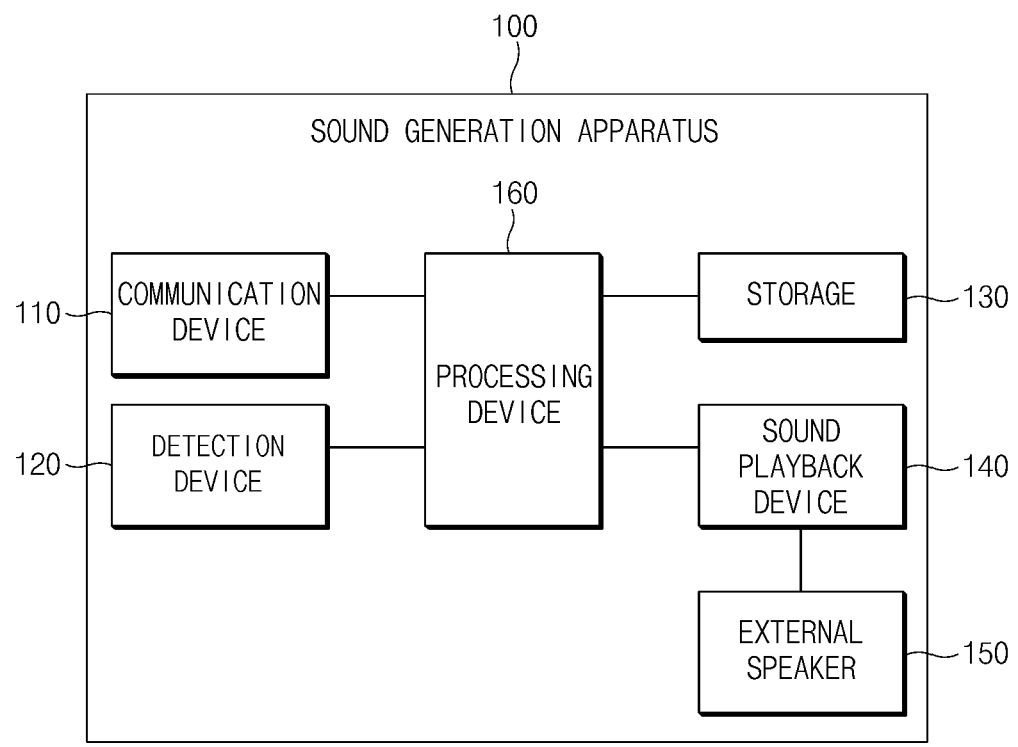
FIG. 1 is a block diagram illustrating a configuration of a sound generation apparatus of an electrification vehicle according to example embodiments of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

As used herein, an "electrification vehicle" is a vehicle, such as an electric vehicle (EV), a plug-in hybrid electric vehicle (PHEV), and/or a hybrid electric vehicle (HEV), which travels, at least in part, using an electric motor.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, some embodiments of the present disclosure will be described in detail with reference to the exemplary drawings. In the drawings, the same reference numerals will be used throughout to designate the same or equivalent elements. In addition, a detailed description of-well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Furthermore, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
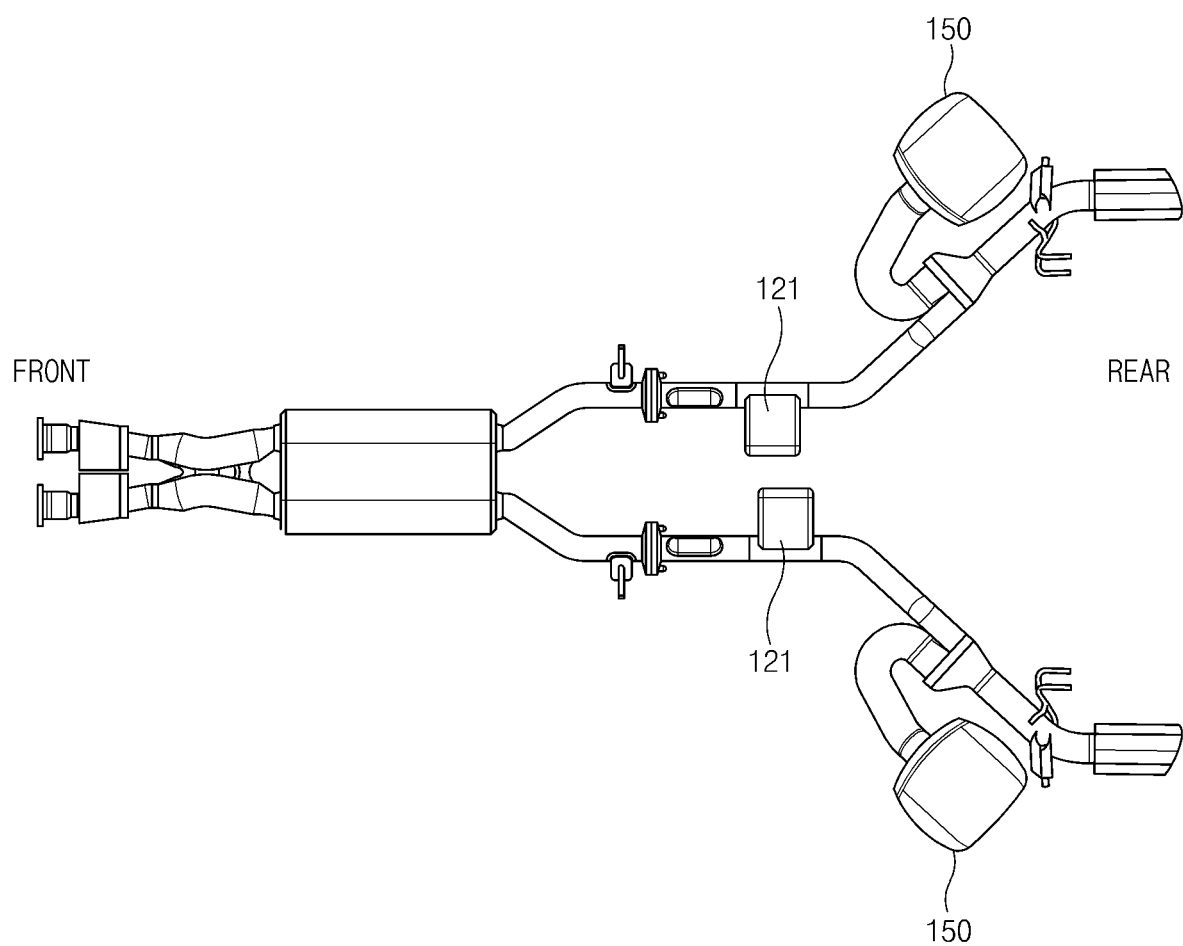
FIG. 2 is a drawing illustrating an exhaust system acoustic structure according to example embodiments of the present disclosure.

FIG. 1 is a block diagram illustrating a configuration of a sound generation apparatus of an electrification vehicle according to embodiments of the present disclosure. FIG. 2 is a drawing illustrating an exhaust system acoustic structure according to embodiments of the present disclosure. FIG. 3 is a drawing illustrating a gain table for a CAN signal according to embodiments of the present disclosure.

A sound generation apparatus 100 of the electrification vehicle may be configured to design a virtual sound based on a hearing experience of a user. Additionally, in example embodiments, the sound generation apparatus 100 may be configured to personalize the virtual sound by means of tone adjustment and accelerator pedal responsiveness adjustment.

Referring to FIG. 1, the sound generation apparatus 100 may include a communication device 110, a detection device 120, a storage 130, a sound playback device 140, an external speaker 150, a processing device 160, and the like.

The communication device 110 may be configured to assist the sound generation device 100 to communicate with electronic control units (ECUs) loaded into the electrification vehicle (hereinafter, referred to as a "vehicle"). The communication device 110 may include a transceiver which is configured to transmit and receive a controller area network (CAN) message using a CAN protocol. The communication device 110 may be configured to assist the sound generation apparatus 100 to communicate with an external electronic device (e.g., a terminal, a server, and the like). The communication device 110 may include a wireless communication circuit (e.g., a cellular communication circuit, a short range wireless communication circuit, and/or a global navigation satellite system (GNSS) communication circuit), a wired communication circuit (e.g., a local area network (LAN) communication circuit and/or a power line communication circuit), and/or the like.

The detection device 120 may be configured to detect driving information, a drive mode (e.g., ECO, COMFORT, DYNAMIC, SPORTY, HIGH PERFORMANCE, TCR, or CUSTOM), and/or environmental information (i.e., vehicle interior environment information and/or vehicle exterior environment information). The detection device 120 may be configured to detect driving information comprising a driver steering angle (or steering wheel), a tire steering angle (or a tie rod), a vehicle speed, motor revolutions per minute (RPM), a motor torque, and/or an accelerator pedal opening amount using sensors and/or ECUs loaded into the vehicle. An accelerator pedal position sensor (APS), a steering angle sensor, a microphone, an image sensor, a distance sensor, a wheel speed sensor, an advanced driver assistance system (ADAS) sensor, a 3-axis accelerometer, an inertial measurement unit (IMU), and/or the like may be used as the sensors. The ECUs may be a motor control unit (MCU), a vehicle control unit (VCU), and/or the like.

Furthermore, the detection device 120 may be configured to detect a sound error and exhaust pressure by means of a post-combustion sensor 121. As shown in FIG. 2, the post-combustion sensor 121 may be mounted on an exhaust system and may include an error sensor and a pressure sensor. The error sensor may be configured to receive feedback on a sound output through the external speaker 150. The error sensor may be configured to compare the fed-back sound with a sound output from the sound generation apparatus 100 to sense a difference between the two sounds (or a sound error). The pressure sensor may be configured to datatize system operation information by checking exhaust pressure.

The storage 130 may be configured to store a sound source of a vehicle sound (or a virtual sound) such as a warning sound, a driving sound, an acceleration sound, and/or a cornering sound. The storage 130 may be configured to store an emotion recognition model, a sound design algorithm, a volume setting algorithm, volume control logic, sound equalizer logic, and/or the like. The emotion recognition model may be implemented based on a sound-based emotion factor and/or a dynamic characteristic-based emotion factor. The sound-based emotion factor may include acceleration and deceleration of downshift emotion, slip and pedal responsiveness of drift emotion, tire slip and an exhaust sound of drive and response emotion, and/or the like. The dynamic characteristic-based emotion factor may include vibration of sound feedback emotion, body stiffness of ride comfort emotion, a chassis balance of maneuverability emotion, and/or the like. The sound-based emotion factor and/or the dynamic characteristic-based emotion factor may be derived by previously evaluating a correlation between vehicle kinetic performance and driving emotion. As an example, a slip upon stop acceleration, a jerk upon shift, and rapid acceleration wide open throttle (WOT) emotional factor correlation may be evaluated by a change in vehicle speed and motor RPM over time. A dynamic characteristic emotional factor correlation except for maneuverability upon cornering may be analyzed by a change in yaw rate and side slip angle over time. The sound design algorithm may include high-performance sound equalizer logic in which engine sound equalizer (ESE) logic considering an engine sound is added to an existing active sound design (ASD) function.

The storage 130 may be a non-transitory storage medium which stores instructions executed by the processing device 160. The storage 130 may include at least one of storage media such as a random access memory (RAM), a static RAM (SRAM), a read only memory (ROM), a programmable ROM (PROM), an electrically erasable and programmable ROM (EEPROM), an erasable and programmable ROM (EPROM), a hard disk drive (HDD), a solid state disk (SSD), an embedded multimedia card (eMMC), a universal flash storage (UFS), and/or a web storage.

The sound playback device 140 may be configured to play and output a sound to speakers mounted on the inside and/or outside of the vehicle. The sound playback device 140 may be configured to play and output a sound source which may be previously stored or which may be streamed in real time. The sound playback device 140 may include an amplifier, a sound player, and the like. The sound playback device may be configured to adjust and play volume, a tone (or sound quality), a sound image, and the like of the sound under an instruction of the processing device 160. The sound playback device may include a digital signal processor (DSP), microprocessors, and/or the like. The amplifier may be configured to amplify an electrical signal of the sound played from the sound playback device.

The external speaker 150 may be configured to output a vehicle sound played by the sound playback device 140 to the outside. The external speaker 150 may be configured to convert the electrical signal amplified by the amplifier of the sound playback device 140 into a sound wave. As shown in FIG. 2, the external speaker 150 may be disposed on the rear of an exhaust manifold. For example, the external speaker 150 may be installed on the rear of an exhaust manifold.

The processing device 160 may be electrically connected with the respective components 110 to 150. The processing device 160 may include at least one of processing devices such as an application specific integrated circuit (ASIC), a digital signal processor (DSP), programmable logic devices (PLD), field programmable gate arrays (FPGAs), a central processing unit (CPU), microcontrollers, and/or microprocessors.

The processing device 160 may be configured to perform sound correction using a big data-based correction algorithm. The processing device 160 may be configured to set a priority for input data upon the sound correction. For example, when the input data is a pedestrian dangerous situation recognition signal and/or a warning signal, the processing device 160 may be configured to reflect the input data in atop priority to perform sound correction. Furthermore, when the input data is environmental information around a highway or a country lane, the processing device 160 may be configured to set sound correction in which the input data is reflected in a lower priority. Furthermore, when the input data is a signal indicating that a call is busy, the processing device 160 may be configured to automatically adjust volume of the sound.

The processing device 160 may be configured to automatically adjust sound volume with regard to a surrounding situation. Furthermore, because a volume difference between drive modes is about 3 dB, the processing device 160 may be configured to determine a variance in gain based on a drive mode and a surrounding situation. A gain for each driving situation (e.g., a high way driving situation, a pedestrian hazard situation, a city driving situation, and the like) may be composed based on data.

When two or more different driving situations occur, the processing device 160 may be configured to determine a priority for each driving situation (or an order where a driving situation is reflected) using a correction algorithm. The processing device 160 may be configured to execute sound correction with regard to the driving situation according to the determined priority.

The processing device 160 may be configured to automatically adjust sound volume with regard to a vehicle interior environment factor and a vehicle exterior environment factor (e.g., a motor temperature, a vehicle speed, a pedal opening amount, and/or the like). A CAN signal determined that a sound influence is larger when the vehicle actually travels may include a correction torque signal, an engine RPM signal, an engine torque signal, a vehicle speed signal, a gear position, the amount of fuel consumption, automatic transmission (A/T) or manual transmission (M/T) information, a torque scale factor, an engine temperature signal, cruise control ON/OFF, a throttle position signal, a pedal position information signal, and the like. A function for providing one of such 13 CAN signals, that is, a correction torque signal to an active virtual sound may be added.

Referring to FIG. 3, in an example embodiment, a gain of 3 dB when the CAN signal CAN 1 is 50% is set to a default gain. The processing device 160 may be configured to decrease volume (i.e., a gain) when a call is received while driving or when the vehicle passes through a quiet country lane and may be configured to increase volume in a section where a critical situation such as a pedestrian hazard is recognized during driving at a constant speed or in a section, such as a highway, which requires a sense of acceleration and an acceleration sound during launch and acceleration driving. Because hearing is sensitive in a 2-3 dB change section, a maximum gain may be set to 8 dB with regard to external noise.

The processing device 160 may be configured to monitor motor RPM, an accelerator pedal opening amount (or accelerator pedal position information), a motor torque, a vehicle speed, and/or the like by means of the detection device 120. The processing device 160 may be configured to determine a driving type (e.g., driving at a constant speed, driving at acceleration, and the like) based on motor RPM, an accelerator pedal opening amount, a motor torque, and a vehicle speed, and/or the like. The processing device 160 may be configured to reflect a vehicle characteristic in a post-combustion signal with regard to the driving type to optimize a sound parameter and may be configured to tune sound quality.

The processing device 160 may be configured to receive a post-combustion signal according to a driver input (e.g., a driver steering angle, accelerator pedal position information, and/or the like). The processing device 160 may be configured to set a post-combustion sound matched with the post-combustion signal. The processing device 160 may be configured to store and correct a sound source of the set post-combustion sound. The processing device 160 may be configured to adjust a tone and volume of the post-combustion sound based on the post-combustion signal. The processing device 160 may be configured to output the adjusted post-combustion sound together with a driving sound to the sound playback device 140.

When braking is detected in the middle of cornering in a constant speed, low speed, or acceleration condition (or situation), the processing device 160 may be configured to block an acceleration sound to convert the acceleration sound into a cornering sound. The processing device 160 may be configured to calculate a post-combustion-based sound concept using pitch, gain, torque, and speed parameters. The processing device 160 may be configured to generate a sound pressure correction profile of the acceleration sound depending on the calculated post-combustion-based sound concept. The processing device 160 may be configured to analyze a longitudinal force, a lateral force, a tire slip ratio, and a tire slip angle based on a driver steering angle and a tire steering angle to calculate a cornering force. The processing device 160 may be configured to adjust a tone and volume of the cornering sound based on the calculated cornering force.

The processing device 160 may be configured to play at least one sound according to a change in parameter associated with a vehicle tire in a time domain to generate an initial sound source. Furthermore, the processing device 160 may be configured to change a tone of the virtual sound source by means of gain control and may adjust resistance to design a virtual cornering sound.

The processing device 160 may be configured to receive a post-combustion sound according to a driver input. The processing device 160 may be configured to convert a post-combustion signal into a post-combustion sound. The processing device 160 may be configured to store a sound source of the previously selected post-combustion sound or may correct the previously stored sound source. Furthermore, the processing device 160 may be configured to adjust a tone and volume of the post-combustion sound. The processing device 160 may be configured to output a driving sound and the converted post-combustion sound, that is, an exhaust sound. The processing device 160 may be configured to output a driving sound through a speaker installed on the front of the vehicle. The processing device 160 may be configured to decrease sound pressure of the exhaust sound output through the speaker installed on the front of the vehicle and may increase sound pressure of the exhaust sound output through a speaker on the rear of the vehicle such that a driver may recognize a sound from the rear of the vehicle.

When an emotional care mode is activated, the processing device 160 may be configured to generate an optimal exhaust sound with regard to driving information (e.g., a driving pattern) such as motor RPM, a motor torque, an accelerator pedal opening amount, a driver steering angle, a tire steering angle, and/or a gear shift. At this time, the processing device 160 may be configured to consider volume and APS responsiveness set in a CUSTOM mode. The processing device 160 may be configured to generate an optimal exhaust sound using a sound design algorithm and may be configured to play and output the generated exhaust sound. The sound playback device 140 may be configured to control a speaker (e.g., a woofer, a subwoofer, and a tweeter) and an exhaust system (e.g., valve adjustment and the external speaker 150).

The processing device 160 may be configured to control a virtual sound using real-time sound pressure and a target sound based on driver emotion modeling. The processing device 160 may be configured to generate a sound pressure correction profile according to power performance based on a deviation according to slow acceleration and rapid acceleration for each driving type. The processing device 160 may be configured to control a virtual sound using the sound pressure correction profile such that the driver enjoys a sensor of acceleration and an acceleration sound and may be configured to stably provide a linearity driving mode. In detail, the processing device 160 may extract an order necessary for sound design. The processing device 160 may be configured to compare sound pressure of a target sound for each order and sound pressure of a target vehicle sound to select an order necessary for sound design. At this time, the processing device 160 may be configured to use a sound pressure curve according to RPM of a target vehicle for each order. The processing device 160 may be configured to calculate a section sound pressure difference by means of a linear regression analysis of a target sound for each order and a target vehicle sound to generate a sound pressure file. The processing device 160 may be configured to generate an accelerator pedal opening amount curve according to RPM for each order and may be configured to select an accelerator pedal opening amount curve according to representative RPM. The processing device 160 may be configured to generate a correction profile (e.g., an RPM-sound pressure profile for each order, an RPM-accelerator pedal opening amount correction profile, a vehicle speed profile, a torque correction profile, and the like) based on the selected accelerator pedal opening amount curve according to the representative RPM.

Figure 4:
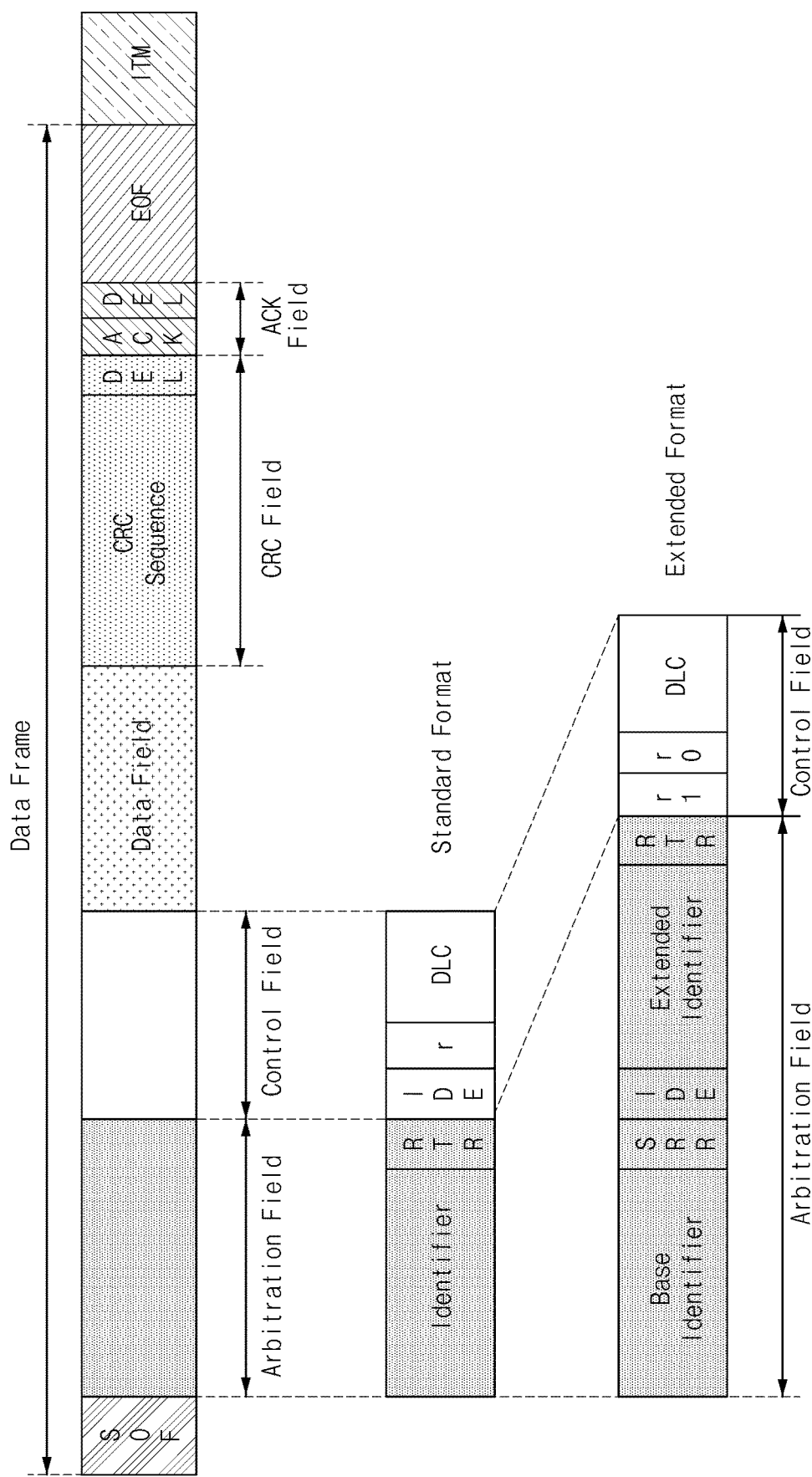
FIG. 4 is a drawing illustrating a CAN message structure according to example embodiments of the present disclosure.

FIG. 4 is a drawing illustrating a CAN message structure according to exemplary embodiments of the present disclosure.

Referring to FIG. 4, a message frame used in data transmission and reception in CAN communication, that is, a data frame may include a start of frame (SOF), an arbitration field, a control field, a data field, a cyclic redundancy check (CRC) field, an acknowledge (ACK) field, and an end of frame (EOF). The SOF may include one dominant bit and may be used to indicate the beginning of a message and synchronize all nodes. The arbitration field may include an 11- or 29-bit ID and a 1-bit remote transmission request (RTR) bit. This region may be used to adjust a collision between messages, which occurs when the messages are transmitted from two or more nodes at the same time. The control field may include a 2-bit identifier extension (IDE) bit, a 4-bit data length code (DLC), and the like. The control field may be used to select a priority of a message, that is, driving information and environmental information. The data field may be used to store data. The CRC field may be used to check where there is an error on the message. The ACK field may be used to transmit an ACK according to the reception of the message. The EOF may be used for the purpose of providing a notification of the end of the message.

A processing device 160 of FIG. 1 may be configured to determine a driving tendency and a road environment based on data included in a message transmitted and received through CAN communication using a CAN algorithm. The processing device 160 may be configured to determine a driving tendency based on cruise control function ON/OFF information, a driving system temperature, and the like. Furthermore, the processing device 160 may be configured to identify a road environment based on global positioning system (GPS) information, a noise difference between the outside and the inside, and the like. When all nodes are bus masters and the bus is in an idle state, the CAN algorithm may transmit a message at any time. Furthermore, when two or more nodes try to transmit messages at the same time, the CAN algorithm may first transmit a message with a higher priority. When an error is detected when transmitting the message, the CAN algorithm may automatically retransmit the message and may monitor a bus state in real time. When a defective node is detected, the CAN algorithm may deactivate the node to ensure stability of the system.

Figure 5:
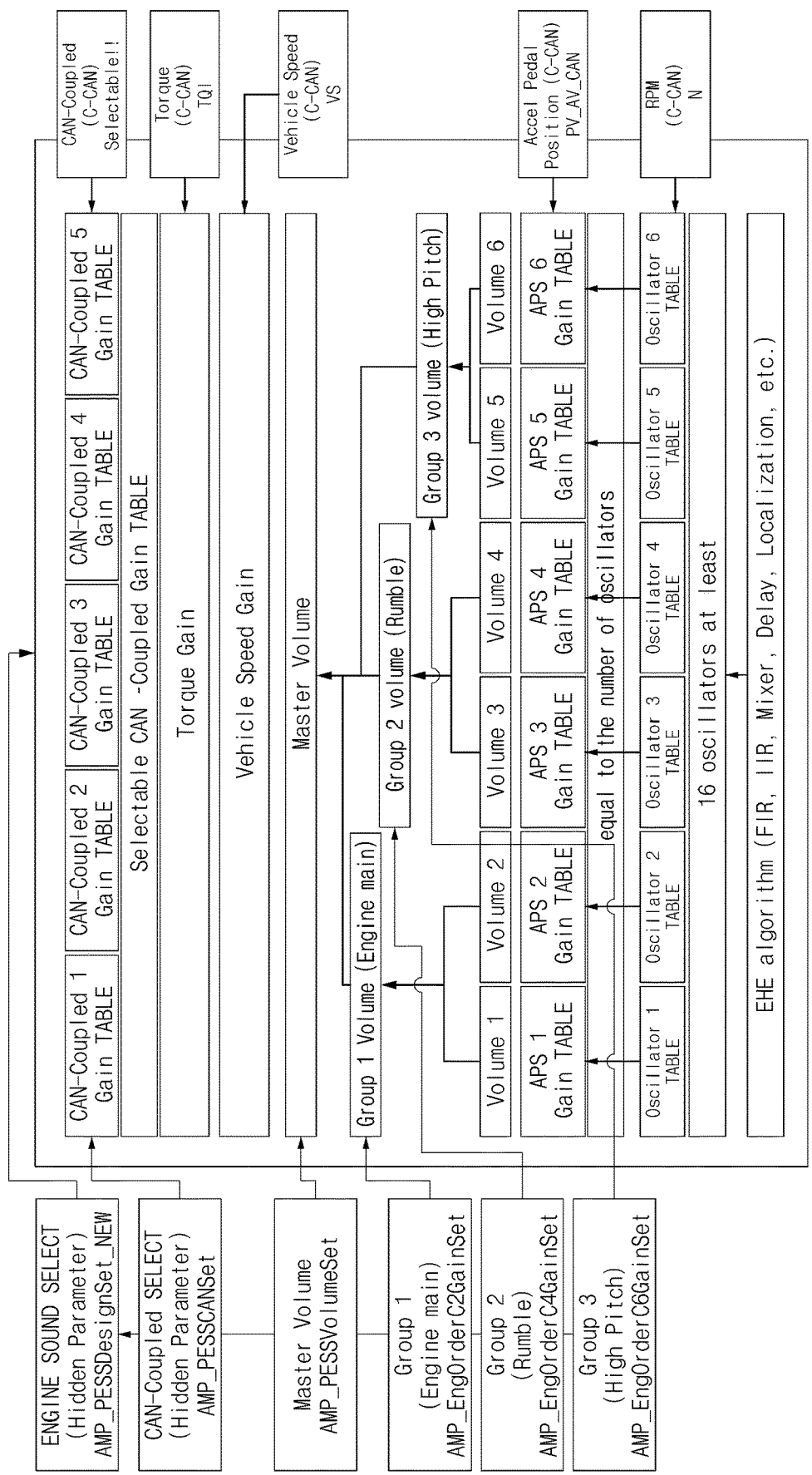
FIG. 5 is a drawing illustrating an amplifier structure according to example embodiments of the present disclosure.

FIG. 5 is a drawing illustrating an amplifier structure according to example embodiments of the present disclosure.

An amplifier of a sound playback device 140 of FIG. 1 may be configured to adjust volume of a sound played from the sound playback device 140 depending on a finally determined variance in gain. The amplifier may be configured to store a gain table for each of pieces of driving information, a gain table for each volume, or a gain table for each tone.

The amplifier may be configured to receive master volume and tone setting information from a head unit. Furthermore, the amplifier may be configured to receive a CAN signal, for example, motor RPM, a motor torque, a vehicle speed, an accelerator pedal position, or the like. The amplifier may be configured to adjust sound volume based on the received master volume and the received tone setting information.

Figure 6A:
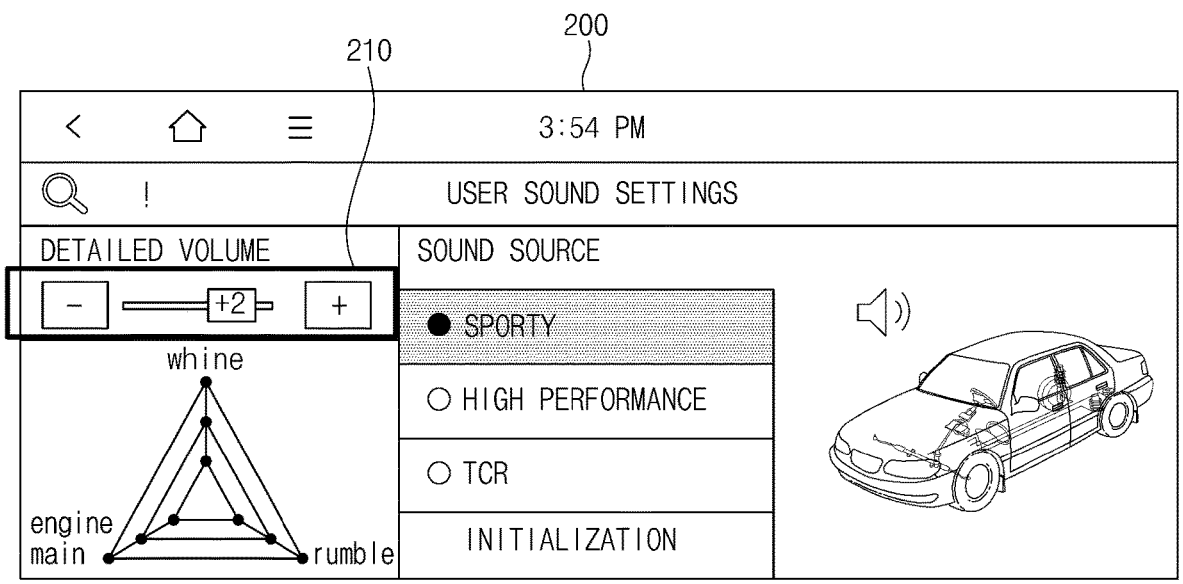
FIG. 6A is a drawing illustrating master volume settings according to example embodiments of the present disclosure.
Figure 6B:
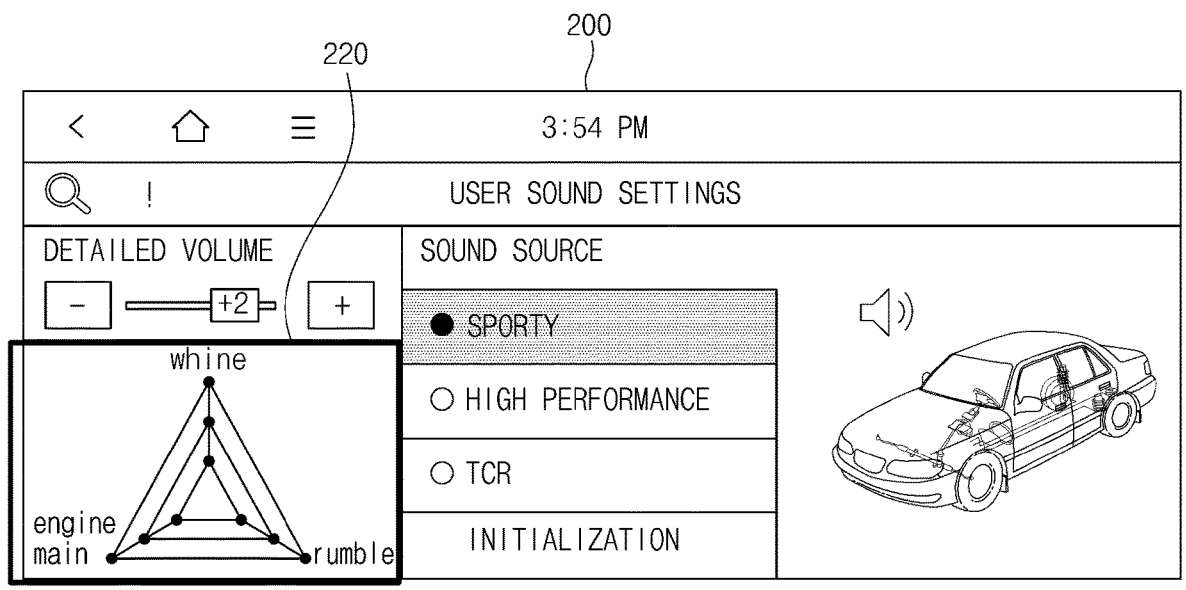
FIG. 6B is a drawing illustrating tone settings according to example embodiments of the present disclosure.

FIG. 6A is a drawing illustrating master volume settings according to example embodiments of the present disclosure. FIG. 6B is a drawing illustrating tone settings according to example embodiments of the present disclosure.

A sound generation apparatus 100 of FIG. 1 may be configured to have a CUSTOM mode as a sub-mode in a driving mode (or a drive mode) to perform personalization settings. Referring to Table 1 below, when the driving mode is SPORTY, HIGH PERFORMANCE, and TCR, the sound generation apparatus 100 may be configured to enter the CUSTOM mode to perform the personalization settings, that is, user sound settings.

TABLE 1

| Driving Mode | Operation Mode | Personalization Settings | Feature |
| --- | --- | --- | --- |
| SPORTY | SPORT | — | Match well with exhaust sound and play natural and linear sound |
|  | CUSTOM | ○ |  |
| HIGH PERFORMANCE | STANDARD | — | Play sound with sense of power and dynamics at low RPM interval |
|  | CUSTOM | ○ |  |
| TCR | CUSTOM | ○ | Play racing vehicle sound |

A processing device 160 of FIG. 1 may be configured to output a user sound setting screen 200 to a display depending on a user input. Herein, the display may be implemented as a touch screen or the like capable of being used as an input device as well as an output device. Referring to FIG. 6A, the processing device 160 may be configured to set detailed volume 210 depending on a user input on the user sound setting screen 200 to perform master volume settings. The processing device 160 may be configured to transmit master volume setting information (i.e., set detailed volume) to a sound playback device 140 of FIG. 1. The sound playback device 140 may be configured to adjust sound volume based on the master volume setting information.

Furthermore, the processing device 160 may be configured to set a tone equalizer 220 depending on a user input on the user sound setting screen 200. Referring to FIG. 6B, the processing device 160 may be configured to adjust a factor, such as a whine, an engine main, and a rumble, depending on manipulation of a user to set a tone equalizer 220. The processing device 160 may be configured to transmit the set tone equalizer information, that is, the set whine, engine main, and rumble to the sound playback device 140. The sound playback device 140 may be configured to adjust a sound tone based on the tone equalizer setting information.

Figure 7:
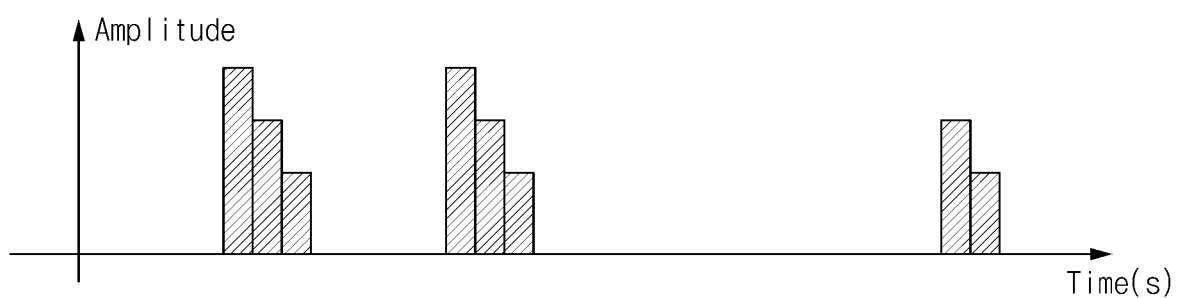
FIG. 7 is a conceptual diagram illustrating a post-combustion signal according to example embodiments of the present disclosure.

FIG. 7 is a conceptual diagram illustrating a post-combustion signal according to example embodiments of the present disclosure.

The post-combustion signal may be generated by motor RPM, a motor torque, accelerator pedal position information, and a virtual shift signal. Herein, the virtual shift signal may be implemented using motor torque deceleration. Referring to FIG. 7, the post-combustion signal may be indicated using a signal magnitude over time. A sound playback device 140 of FIG. 1 may be configured to store a sound source including certain time sound information of a waveform audio format (WAV) or the like. The sound playback device 140 may be configured to play a sound source based on the post-combustion signal For example, the sound playback device 140 may be configured to adjust volume based on the signal magnitude and may play a sound at a time when the signal is generated.

Figure 8:
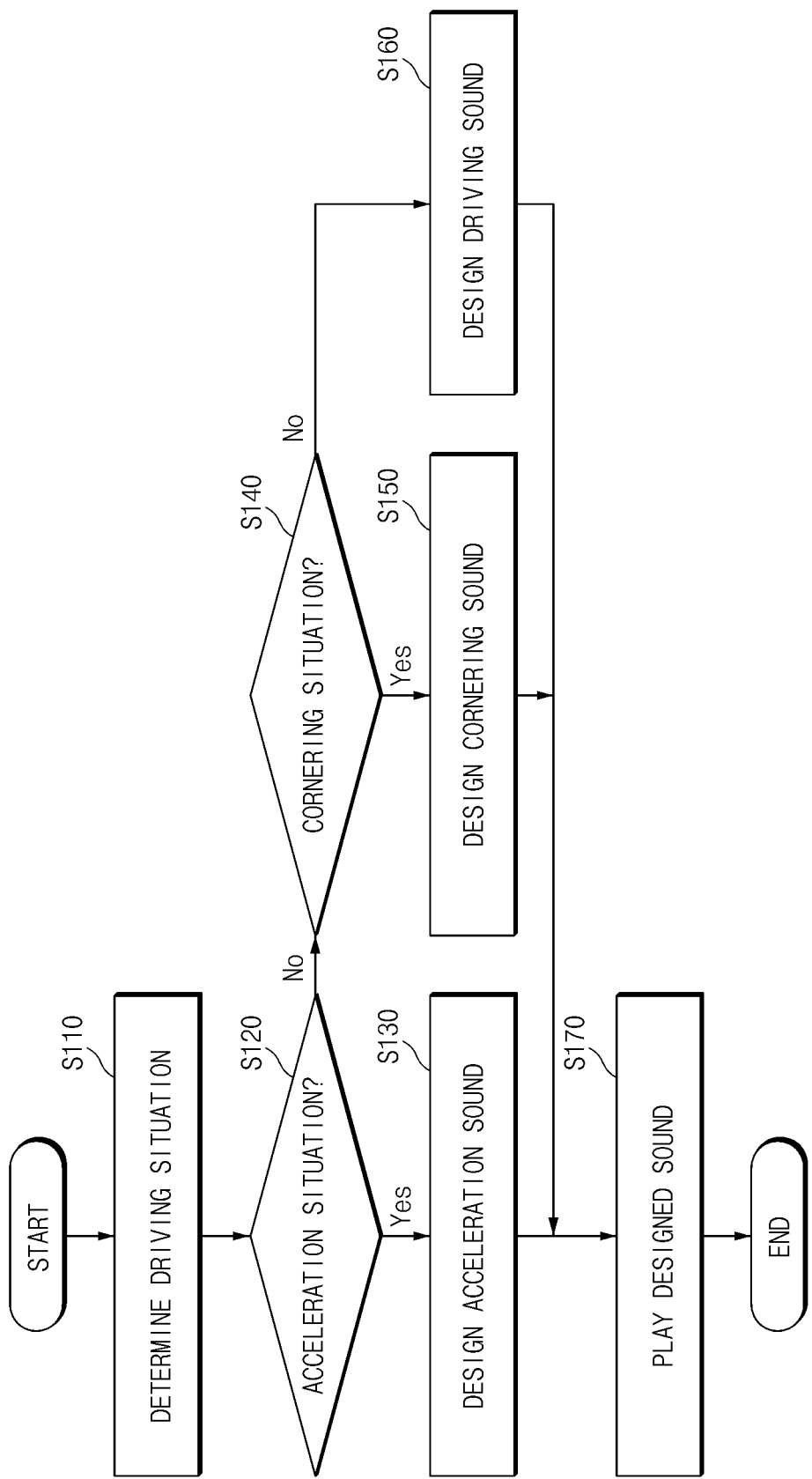
FIG. 8 is a flowchart illustrating a sound generation method according to example embodiments of the present disclosure.

FIG. 8 is a flowchart illustrating a sound generation method according to example embodiments of the present disclosure.

Referring to FIG. 8, in S110, a processing device 160 of FIG. 1 may determine a driving situation based on driving information of a vehicle. The processing device 160 may determine a driving situation based on driving information such as a driver steering angle, a tire steering angle, a vehicle speed, motor RPM, a motor torque, and/or an accelerator pedal opening amount detected by a detection device 120 of FIG. 1.

In S120, the processing device 160 may identify whether the driving situation is an acceleration situation.

When the driving situation is the acceleration situation, in S130, the processing device 160 may design an acceleration sound. The processing device 160 may fuse a post-combustion sound generation technology with a sound pressure correction profile to design a virtual sound.

When the driving situation is not the acceleration situation in S120, in S140, the processing device 160 may identify whether the driving situation is a cornering situation.

When the driving situation is the cornering situation, in S150, the processing device 160 may design a cornering sound. The processing device 160 may analyze a longitudinal force, a lateral force, a tire slip ratio, a tire slip angle, or the like and may design (generate) a cornering sound based on the analyzed result.

When the driving situation is not the cornering situation in S140, in S160, the processing device 160 may design a driving sound. The processing device 160 may generate a driving sound using a driving sound design algorithm.

In S170, the processing device 160 may play the designed sound. The processing device 160 may play and output at least one of the acceleration sound, the cornering sound, or the driving sound by means of a sound playback device 140 of FIG. 1.

The above-mentioned embodiment describes designing the vehicle sound (or the virtual sound) with regard to only the driving information of the vehicle, but is not limited thereto. A sound generation apparatus 100 of FIG. 1 may consider a driving environment (i.e., a road environment, a vehicle interior environment, a vehicle exterior environment, or the like) of the vehicle together to design a vehicle sound.

Figure 9:
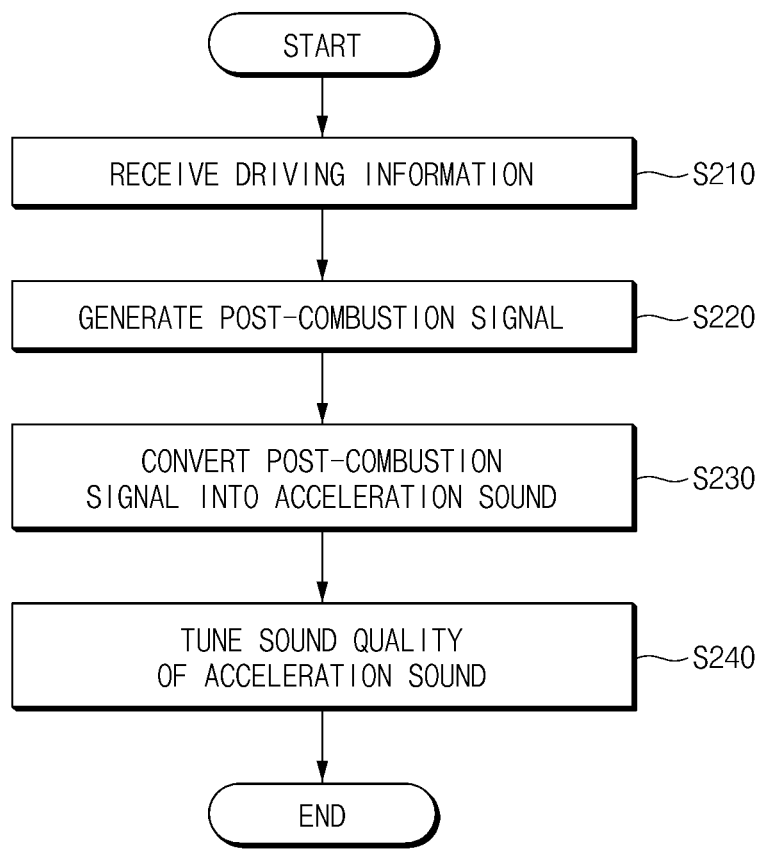
FIG. 9 is a flowchart illustrating a method for designing an acceleration sound according to example embodiments of the present disclosure.

FIG. 9 is a flowchart illustrating a method for designing an acceleration sound according to example embodiments of the present disclosure.

In S210, a processing device 160 of FIG. 1 may obtain driving information. The processing device 160 may receive driving information such as motor RPM, a motor torque, an accelerator pedal position (or an accelerator pedal opening amount), and/or a vehicle speed from a detection device 120 of FIG. 1.

In S220, the processing device 160 may generate a post-combustion signal based on the received driving information. The processing device 160 may generate a post-combustion signal in which a vehicle characteristic is reflected with regard to a driving type (e.g., constant speed, low speed launch, medium speed acceleration, high speed acceleration, and the like) based on the received driving information.

In S230, the processing device 160 may convert the generated post-combustion signal into an acceleration sound. The processing device 160 may optimize a sound parameter. The processing device 160 may store and correct a sound source, may adjust a tone and volume, and may adjust a playback frequency band using a frequency filter.

In S240, the processing device 160 may tune sound quality of the converted acceleration sound. The processing device 160 may adjust a factor such as an engine main, a whine, and a rumble of the sound.

Thereafter, the processing device 160 may output the tuned acceleration sound to a sound playback device 140 of FIG. 1. The sound playback device 140 may play and output the tuned acceleration sound to an external speaker 150 of FIG. 1.

Figure 10:
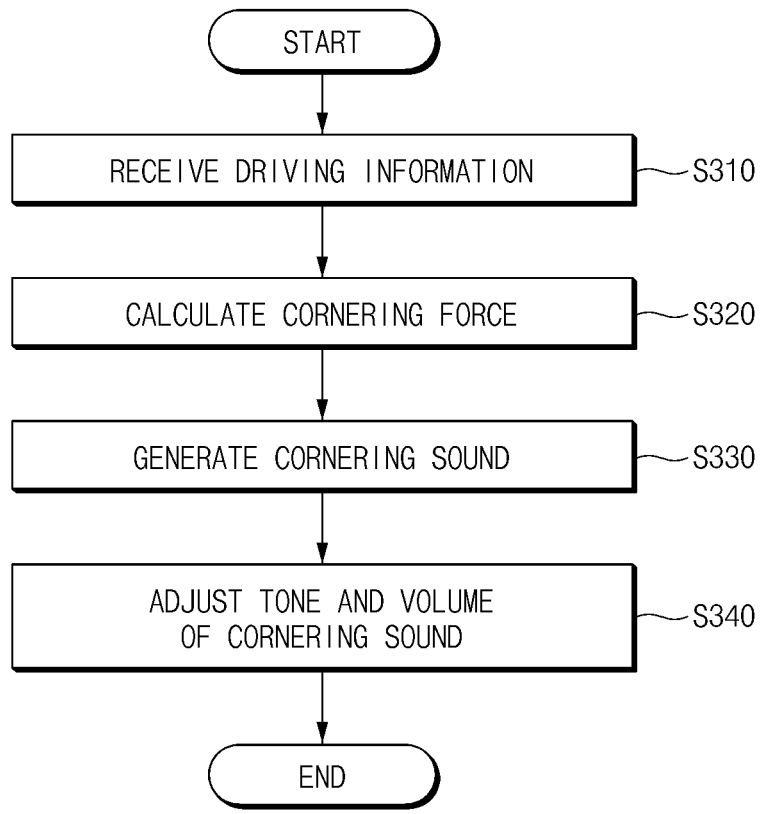
FIG. 10 is a flowchart illustrating a method for designing a cornering sound according to example embodiments of the present disclosure.

FIG. 10 is a flowchart illustrating a method for designing a cornering sound according to example embodiments of the present disclosure.

In S310, a processing device 160 of FIG. 1 may receive driving information. The processing device 160 may receive driving information such as a driver steering angle and a tire steering angle.

In S320, the processing device 160 may calculate a cornering force based on the received driving information. The processing device 160 may provide a vibration signal due to load transfer by measuring front, center, and rear displacements of a vehicle body. The processing device 160 may provide 4 point air pressure and a temperature deviation of front and rear tires. The processing device 160 may analyze a longitudinal force, a lateral force, a tire slip ratio, and/or a tire slip angle to calculate a cornering force.

In S330, the processing device 160 may generate a cornering sound based on the calculated cornering force. The processing device 160 may play several sounds according to a change in parameter of the vehicle and the tire in a time domain to generate an initial sound source.

In S340, the processing device 160 may adjust a tone and volume of the cornering sound. The processing device 160 may change a tone of the virtual sound source by means of gain control and may adjust resistance to design a virtual cornering sound.

Figure 11:
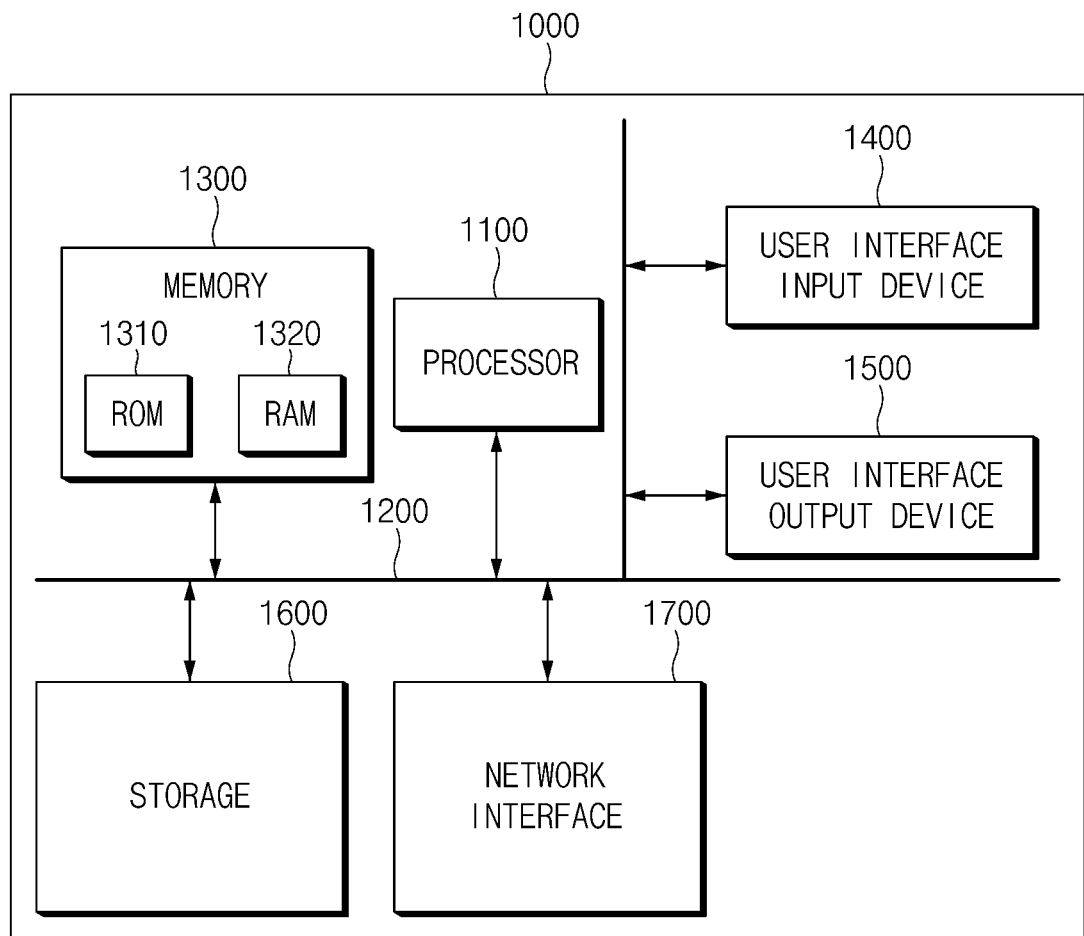
FIG. 11 is a block diagram illustrating a computing system for executing a sound generation method according to example embodiments of the present disclosure.

FIG. 11 is a block diagram illustrating a computing system for executing a sound generation method according to example embodiments of the present disclosure.

Referring to FIG. 11, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Thus, the operations of the method or the algorithm described in connection with example embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor 1100. The processor 1100 may be configured to read out information from the storage medium and may be configured to write information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

According to example embodiments of the present disclosure, the sound generation apparatus may be configured to design and provide an acceleration sound and/or a cornering sound based on a driving tendency and a driving environment to provide a virtual sound customized for a user, thus improving satisfaction.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, embodiments of the present invention are not intended to limit the technical spirit of the present invention, but provided only for the illustrative purpose. The scope of the present disclosure should be construed on the basis of the accompanying claims, and all the technical ideas within the scope equivalent to the claims should be included in the scope of the present disclosure.

What is claimed is:

1. A method of generating sound in an electrification vehicle, the method comprising:
   receiving, by a processing device, driving information;
   determining, by the processing device, a driving situation based on the driving information;
   designing, by the processing device, an acceleration sound, when the driving situation is determined as an acceleration situation;
   designing, by the processing device, a cornering sound, when the driving situation is determined as a cornering situation; and
   playing and outputting, by the processing device, the acceleration sound or the cornering sound,
   wherein designing the acceleration sound comprises:
   generating, by the processing device, a post-combustion signal based on the driving information; and
   converting, by the processing device, the generated post-combustion signal into the acceleration sound,
   wherein designing the cornering sound comprises:
   calculating, by the processing device, a cornering force based on the driving information;
   generating, by the processing device, the cornering sound based on the calculated cornering force; and
   adjusting, by the processing device, a tone and volume of the generated cornering sound.

2. The sound generation method of claim 1, wherein the receiving of the driving information includes:
   receiving, by the processing device, at least one of motor revolutions per minute (RPM), a motor torque, a vehicle speed, or an accelerator pedal opening amount from a detection device.

3. The method of claim 1, wherein receiving the driving information comprises:
   receiving, by the processing device, at least one of a driver steering angle or a tire steering angle from a detection device.

4. The method of claim 1, wherein receiving the driving information comprises:
   receiving, by the processing device, a controller area network (CAN) message through CAN communication; and determining, by the processing device, a driving tendency and a road environment based on data included in the CAN message using a CAN algorithm.

5. The method of claim 1, wherein designing the acceleration sound comprises:
tuning, by the processing device, sound quality of the converted acceleration sound.

6. The method of claim 5, wherein converting the generated post-combustion signal into the acceleration sound comprises:
adjusting, by the processing device, sound pressure of the acceleration sound based on a magnitude of the post-combustion signal; and
adjusting, by the processing device, the acceleration sound to be played at a time when the post-combustion signal is generated.

7. The method of claim 1, wherein calculating the cornering force comprises:
analyzing, by the processing device, at least one of a longitudinal force, a lateral force, a tire slip ratio, or a tire slip angle based on the driving information.

8. The method of claim 1, wherein the playing and outputting of the acceleration sound or the cornering sound includes:
outputting, by the processing device, the played acceleration sound or cornering sound through an external speaker.

9. The method of claim 8, wherein the external speaker is disposed on the rear of an exhaust manifold.

10. A sound generation apparatus of an electrification vehicle, the sound generation apparatus comprising:
a detection device configured to detect driving information; and
a processing device connected to the detection device,
wherein the processing device is configured to:
determine a driving situation based on the driving information;
design an acceleration sound, when the driving situation is determined as an acceleration situation;
generate a post-combustion signal based on the driving information;
convert the generated post-combustion signal into the acceleration sound;
design a cornering sound, when the driving situation is determined as a cornering situation; and
play and output the acceleration sound or the cornering sound,
wherein the processing device is configured to:
calculate a cornering force based on the driving information;
generate the cornering sound based on the calculated cornering force; and adjust a tone and volume of the generated cornering sound.

11. The sound generation apparatus of claim 10, wherein the driving information comprises at least one of motor RPM, a motor torque, a vehicle speed, or an accelerator pedal opening amount.

12. The sound generation apparatus of claim 10, wherein the driving information comprises at least one of a driver steering angle or a tire steering angle.

13. The sound generation apparatus of claim 10, wherein the processing device is configured to:
receive a CAN message through CAN communication; and
determine a driving tendency and a road environment based on data included in the CAN message using a CAN algorithm.

14. The sound generation apparatus of claim 10, wherein the processing device is configured to:
tune sound quality of the converted acceleration sound.

15. The sound generation apparatus of claim 14, wherein the processing device is configured to:
adjust sound pressure of the acceleration sound based on a magnitude of the post-combustion signal; and
adjust the acceleration sound to be played at a time when the post-combustion signal is generated.

16. The sound generation apparatus of claim 10, wherein the processing device is configured to analyze at least one of a longitudinal force, a lateral force, a tire slip ratio, or a tire slip angle based on the driving information to calculate the cornering force.

17. The sound generation apparatus of claim 10, wherein the processing device is configured to output the played acceleration sound or cornering sound through an external speaker.

18. The sound generation apparatus of claim 17, wherein the external speaker is disposed on the rear of an exhaust manifold.

* * * * *